Figure 1:
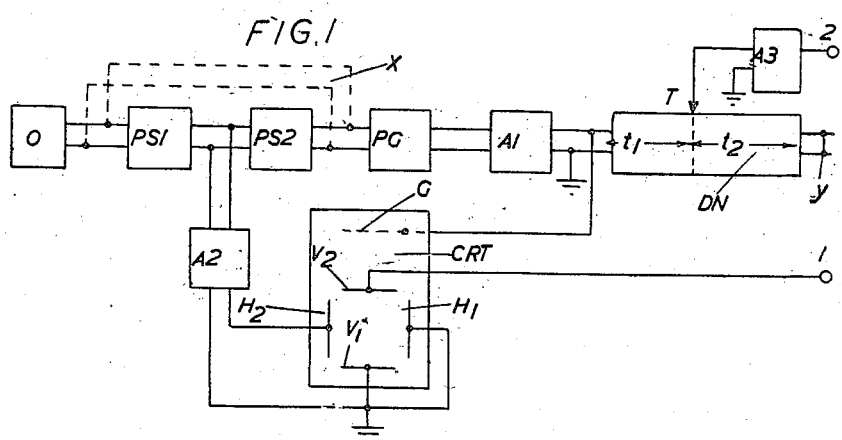

Dec. 24, 1946.  M. M. LEVY ET AL  2,412,996
ARRANGEMENT FOR GENERATING AND OBSERVING ELECTRIC PULSES
Filed Dec. 2, 1943

Inventors
Maurice Moïse Levy.
Thomas William Elliott.
By
Attorney

Patented Dec. 24, 1946

2,412,996

UNITED STATES PATENT OFFICE 2,412,996

ARRANGEMENT FOR GENERATING AND OBSERVING ELECTRIC PULSES

Maurice Moise Levy and Thomas William Elliott, London, England, assignors, by mesne assignments, to International Standard Electric Corporation, New York, N. Y., a corporation of Delaware Application December 2, 1943, Serial No. 512,570
In Great Britain January 29, 1943

8 Claims. (Cl. 315—20)

The present invention relates to means for observing periodic electric phenomena employing oscillographs or the like, for example, to determine the form of an electrical pulse; and is principally intended for cases where the duration of the pulse, or portion of a pulse or other wave form to be observed, is very short compared with the period of repetition.

In the usual arrangements for observing periodically repeated phenomena on a cathode ray oscillograph tube, for example, a time base having a frequency equal to the repetition frequency or to a multiple or submultiple thereof is provided in order to obtain the horizontal deflection of the cathode beam. For this time base a sawtooth wave is generally used, and this must be synchronised with the repeated pulses or wave form in order to obtain a fixed trace on the oscillograph screen. If the frequency of the time base is the same as the repetition frequency and if the ratio P/R of the pulse duration to the repetition interval is very small, then the width of the trace will be so small that no details can be seen. It is therefore necessary to multiply the frequency of the time base by a large factor and to synchronise it on a high harmonic of the repetition frequency in order to spread out the horizontal deflection so that the desired details can be resolved.

It is found in practice that there are considerable difficulties in synchronising the time base on such a high harmonic, and an unstable system generally results.

The object of the present invention is to provide a simple and satisfactory means of observing with a cathode ray tube or other oscillograph a periodically repeated electrical wave form of duration short compared with the repetition interval, or a very small part of an extended wave form, without the necessity for using a high frequency time base, so that the above mentioned synchronising difficulties are avoided.

The invention may be very advantageously combined with a pulse generating system to enable the form of the pulses to be observed and so kept under control, though it may be used more generally for observing pulses or portions of repeated wave forms originating elsewhere.

According to the invention, there is provided an arrangement for observing short periodically repeated electrical phenomena on an oscillograph characterised in this, that an electric wave of sinusoidal form is used to produce the time deflection on the oscillograph, a substantially linear portion of the said wave being utilised to effect each transit of the indicating element of the oscillograph over its useful range, the said wave being synchronised so that the occurrences of the electrical phenomena coincide with the linear portions of the wave.

The invention also provides an arrangement for observing short periodically repeated electrical phenomena on an oscillograph in which a sinusoidal electric wave is used to produce a time deflection of the oscillograph indicating element, the oscillograph being operative only for short periodically repeated intervals determined by the sinusoidal wave, during which intervals the time deflection is substantially linear.

According to another aspect, the invention comprises an arrangement for generating a train of short periodically repeated electrical pulses and for observing their form on an oscillograph screen, comprising means for blocking the oscillograph to prevent it from indicating, means for generating a second train of periodically repeated rectangular pulses each of longer duration than the said first mentioned pulses for unblocking the oscillograph, each of which longer pulses completely overlaps in time one of the first mentioned short pulses, the generation of both trains of pulses being controlled by the same sinusoidal wave, means being provided for applying the said sinusoidal wave to the oscillograph in such a manner that a time deflection is obtained which is substantially linear during the periods when the oscillograph is unblocked.

Figure 2:
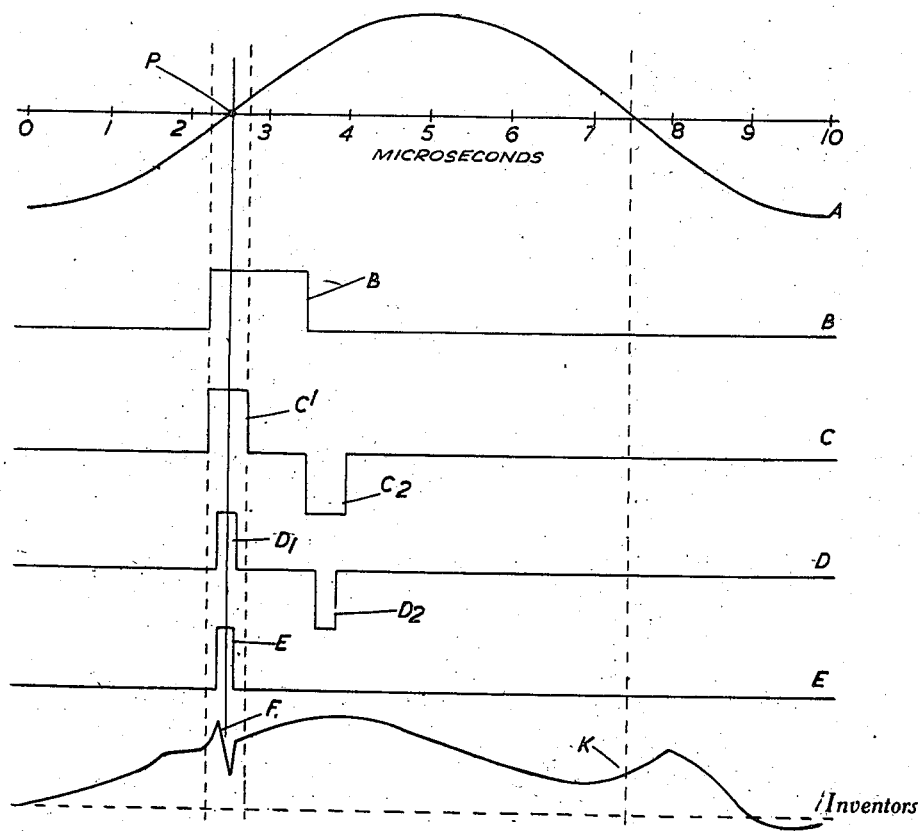

The invention will be described with reference to the accompanying drawing in which:

Fig. 1 shows a block schematic diagram of an arrangement according to the invention; and Fig. 2 shows wave form diagrams used to explain the operation of the arrangement of Fig. 1.

In observing waveforms on an oscillograph, it is of course necessary to know the relation between the deflections and the corresponding quantities producing the deflections. Actually the only relation which is of very much practical use is a linear relation, and in particular, the horizontal deflection should be substantially proportional to time. The present invention takes advantage of the fact that if a sinusoidal voltage be applied to the deflecting plates of a cathode ray tube, the velocity of the spot on the screen is very nearly constant during a relatively large part of the period of the wave in the neighbourhood of the point where the voltage is changing sign. It can easily be shown that the departure from constancy of this velocity does not exceed about 2½% over a quarter of a period of the wave.

Accordingly a sine wave from a suitable oscillator is used for the time base so that a full scale deflection is produced by a suitable length of the linear portion of the wave, according to the duration of the pulse, or portion of a wave form, which it is desired to observe. In order to eliminate the return trace which might cause other undesired pulses or portions of the wave form to appear, it is arranged so that the cathode beam is suppressed except just for short periods covering the occurrence of the pulses etc. which are to be observed.

In order to explain the invention, the block schematic diagram of an embodiment shown in Fig. 1 will be described, and its operation will then be explained with the help of the diagrams of Fig. 2. To make the explanation clear, specific numerical values will be given, but it will be understood that these values are for illustration only and different values may be used in other circumstances.

Referring to Fig. 1, it will be assumed that pulses having a repetition frequency of 100 kilocycles per second and a duration of ¼ microsecond have to be observed, so that the P/R ratio is 0.025. Disregarding for the present the dotted connections $x$, an oscillator O supplies a sinusoidal wave having a frequency of 100 kilocycles per second through two adjustable phase shifters PS1 and PS2 to a pulse generator PG, which may be a multi-vibrator or of any other type adapted to generate substantially rectangular pulses derived from or synchronised by the sinusoidal wave according to well-known principles, the repetition frequency being 100 kilocycles per second.

These pulses are supplied through an appropriate amplifier A1 to a delay network DN which is preferably in the form of a non-dissipative artificial line having the output terminals $y$ short-circuited, as indicated. The input impedance of the delay network should be matched to the output impedance of the amplifier A1.

The circuit is branched at a point between the two phase shifters in order to supply the sinusoidal waves to another amplifier A2 having an adjustable gain, and thence to the horizontally deflecting plates H1 and H2 of a cathode ray oscillograph tube CRT. One of the vertically deflecting plates V2 is connected to an input terminal 1, to which are supplied the pulses or other wave forms to be observed. The remaining vertically deflecting plate V1 and the plate H1 are connected to earth, as is also one of the input terminals of the delay network DN. The other input terminal of DN is connected to a modulating or control grid G in the tube CRT adapted to suppress the cathode beam when suitably polarised.

The delay network DN may comprise a number of sections of a simple low pass wave filter consisting of a number of series inductances and shunt condensers arranged in ladder form. The electrical length of the sections should be small enough so that the cut-off frequency is well above the highest frequency necessary to define the pulses. The delay is then substantially independent of frequency. This network may, however, take any other suitable known form.

An adjustable tapping point T enables connection to be made to any section of the network. and is connected through an appropriate amplifier A3 to an output terminal 2.

Referring to Fig. 2, the curve A shows the form of one complete period of the voltage wave generated by the oscillator O, together with a time scale in micro-seconds. Curve E shows one of the incoming pulses applied to terminal 1, which occurs at 2½ micro-seconds, and has a duration of about ¼ micro-second. The next pulse would occur at 12½ micro-seconds and is not shown in Fig. 2. It will be seen that curves A and E have been registered so that the centre line of the pulse occurs at the moment when the wave A is crossing the axis, which is at the centre point P of the substantially straight part of the wave. This registration can be obtained by suitable adjustment of the phase shifter PS1 which is provided for this purpose.

By suitably adjusting the gain of the amplifier A2, the horizontal deflection of the cathode beam corresponding to the duration of the pulse E may be made any desired proportion of the whole width of the screen (for example, it may be ¾ of this width). Also, since this duration is only about one fortieth of the period of the wave A, the departure from linearity of the time scale will be quite inappreciable.

It will be noted that a return trace at 7½ micro-seconds will occur, producing an unwanted horizontal line or an unwanted pulse or portion of a waveform or other disturbance if any is present at that time. To prevent this, the control grid G of the cathode ray tube is polarised to suppress the beam except for a short period in the neighbourhood of 2½ micro-seconds. To this end, the rectangular pulses from the pulse generator PG are used. Curve B of Fig. 2 shows one of these pulses, the leading edge of which should be arranged to arrive shortly before the time corresponding to the point P, for example, at 2¼ microseconds. This is determined by suitable adjustment of the phase shifter PS2. This pulse B after amplification in A1 is applied to the delay network, and the impulse due to the leading edge will travel to the short circuited end of DN and will there be reflected with an inversion, and will travel back to the input terminals producing there a short pulse $C_1$, shown on curve C, the duration of which is equal to twice the transit time $t_1 + t_2$ through the network DN. The trailing edge of the pulse B will produce a second similar but inverted pulse $C_2$. The pulses $C_1$ and $C_2$ are applied to the control grid G of the cathode ray tube, and it is arranged so that $C_1$ is of such polarity and magnitude as to unblock the beam. A trace will therefore be obtained only during the period of $C_1$. Pulse $C_2$ will have no effect beyond augmenting the suppression of the beam. It is to be noted that by arranging for a proper impedance matching at the input terminals of the delay network DN, there will be no further reflections there.

The duration of the pulse $C_1$ should be such as completely to overlap by a small amount on either side the pulse E which it is desired to observe. In Fig. 2 the pulse $C_1$ is shown as lasting from 2¼ to 2¾ microseconds and overlaps the pulse E by about ⅛ microsecond on either side, as indicated by the vertical dotted lines. The duration of the pulse B is not of much importance so long as it is greater than the duration of $C_1$, since the pulse derived from the trailing edge is not used.

It will be understood from the above explanation that the registration of the point P and the pulse $C_1$ is determined by the phase shifter PS2. If now the phase shifter PS1 be adjusted, the wave A and the pulse $C_1$ will be together shifted horizontally, and the point P may be made to register with the incoming pulse E which it is desired to observe.

It will, of course, be obvious that periodical pulses of any form, not necessarily rectangular, can be observed in the manner described. It is only necessary to choose the duration of the unblocking pulse $C_1$ so as to overlap appropriately the pulse, and to provide a suitable horizontal deflection by means of the amplifier A2.

Although it has been assumed in the example chosen for illustration that the frequency generated by the oscillator O is the same as the repetition frequency of the pulses being observed, it could alternatively be any harmonic of the pulse repetition frequency. In some cases such an arrangement is preferable, since if the $n$th harmonic is used, the width of the pulse as traced on the oscillograph screen will be increased $n$ times, other things being equal. Thus, for example, good results would be obtained if the frequency of the oscillator O were 100 kilocycles per second and the pulse repetition frequency were 10 kilocycles per second. In such a case, the pulse generator PG would be designed to generate pulses at 10 kilocycles per second, and would be synchronised by the oscillator generating the 10th harmonic frequency, 100 kilocycles per second, according to well known methods.

It has been assumed that the frequency of the oscillator O is exactly the same as the repetition frequency of the incoming pulses (or as a harmonic thereof). Unless these pulses are derived directly or indirectly from this oscillator, this will usually be only approximately the case, and accordingly it is necessary to provide the oscillator O with a fine adjustment of the frequency to enable it to be exactly synchronised with the pulses. In some cases a suitable arrangement may be provided for causing the incoming pulses to synchronise the oscillator according to known principles. Alternatively, the sine wave A might be derived from the incoming pulses themselves by appropriate amplification and filtering.

When however the pulses are ultimately derived from the oscillator O, for example in a course indicating or obstacle locating system employing pulses reflected from objects, such special synchronising arrangements will not be necessary. Fig. 1 shows how a train of pulses for such a system may be very easily generated. At the tapping point T on the network DN the pair of pulses shown in curve D of Fig. 2 is obtained. The width of these pulses is $2t_2$ where $t_2$ is the time taken for an impulse to travel from the point T to the short circuited end of the network. The leading edge of $D_1$ occurs at a time $t_1$ after the leading edge of the pulse B enters the network, and the trailing edge is due to the reflection of the leading edge of B and arrives after a further time $2t_2$. The second pulse $D_2$ is produced in the same way by the trailing edge of B. The pulses $D_1$ and $D_2$ are passed through an amplifier $A_3$ biassed in such a manner as to suppress the negative pulse $D_2$. A pulse similar to E is then obtained at the output terminal 2. These pulses may be observed on the tube CRT by connecting the terminals 1 and 2. If, however, it is not desired to observe any pulses originating outside the circuit of Fig. 1, or in other words, if the arrangement is merely for the purpose of checking the pulses generated in the manner just described, then the phase shifter PS2 is not required. It may be omitted, and the pulse generator PG is in that case connected directly to the output of the oscillator as indicated by the dotted lines $x$. It will be understood that the registration of the generated pulse E and the unblocking pulse $C_1$ is automatically obtained by the arrangement of the network DN, so that no corresponding phase adjustment is necessary. It is still however, necessary to obtain registration of the point P and the pulse DI and this is done as before by the phase shifter PSI.

It will be evident that by suitably choosing the network DN, the times $t_1$ and $t_2$ may be varied within wide limits. It could be easily arranged to vary $t_1 + t_2$ by short-circuiting the network at any intermediate point instead of at the output terminals, by means of an appropriate switch. The pulse generator can also be provided with suitable means for adjusting the duration of the pulse B according to the duration required for $C_1$.

Although the arrangement described will be particularly useful when the ratio P/R is very small, it has already been pointed out that the departure from linearity of the time base is only about 2½% over a quarter of a period of the wave A, that is over about one eighth of a period on either side of the point P. In other words, the arrangements can still be used without sensible distortion up to values of P/R of 0.25. It is also useable for values at least as small as 0.001, and for pulses having a duration as short as 0.1 microsecond.

In an actual practical case, the substantially linear part of the horizontal time base derived from a sine wave at 100 kilocycles per second was spread out over a length of 100 mm. on the oscillograph screen. A pulse of duration 0.1 microsecond was then about 4 mm. wide. By increasing the gain of the amplifier A2, still shorter pulses can be made to appear on the screen with reasonable widths.

Although, for convenience, it has been assumed that the wave form to be observed is that of short periodically repeated pulses, the arrangement may be used to observe a detail of any periodically recurring wave form. For example, curve F of Fig. 2 shows a periodic wave of any form having a significant detail F which occurs over a very small fraction of the period, and whose form must be checked. In this case the width of the pulse $C_1$ is adjusted to overlap the detail F, and the deflection of the cathode ray tube is adjusted so that the trace of F covers a sufficiently large proportion of the available screen area. The phase shifter PSI is used as before to register the point P in curve A with the detail F. It will be noted that the portion K of the wave would show on the oscillograph screen, and would tend to obscure the detail F, if the cathode beam were not suppressed in the manner described.

It should also be noted that the cathode beam may be deflected by means of two coils instead of two pairs of plates. In this case the time base sine wave is supplied in series with one of the coils and the incoming pulses or other waves in series with the other coil. Furthermore, the invention is not necessarily restricted to an oscillograph of the cathode ray type; it is applicable to any type of oscillograph capable of producing the type of indication required, in which the operation of the indicating element or means can be suppressed by appropriate means.

What is claimed is:

1. An apparatus for generating a train of short periodically repeated electrical pulses and for observing their form on an oscillograph screen, comprising means for normally blocking the oscillograph to prevent it from indicating, means for generating a second train of periodically repeated rectangular pulses each of longer duration than each of the said first-mentioned pulses for unblocking the oscillograph, each of which longer pulses completely overlaps in time one of the first mentioned short pulses, means whereby the generation of both trains of pulses are controlled by the same sinusoidal wave, means for applying said first mentioned pulses to said oscillograph to produce form deflection, and means for applying the said sinusoidal wave to the oscillograph in such a manner that a time deflection is obtained which is substantially linear during the periods when the oscillograph is unblocked.

2. An apparatus enabling the observation of the form of short periodically repeated electrical phenomena on an oscillograph, comprising means utilizing an electric wave while in sinusoidal form to produce the time deflection on the oscillograph, means for applying said phenomena to said oscillograph to produce a form deflection, means for synchronizing said wave so that occurrences of the electrical phenomena coincide with the substantially linear portions of the wave, and means controlled by the sinusoidal wave for generating a train of periodically repeated rectangular pulses for unblocking the oscillograph to render it operative during the said periodically repeated intervals.

3. An apparatus for tracing on an oscillograph screen the forms of periodically repeated electrical phenomena comprising means for normally blocking the oscillograph to prevent it from indicating, means for generating and applying an alternating voltage to the oscillograph for producing a time deflection of the indicating element thereof, means controlled by the alternating voltage for generating a train of periodically repeated rectangular pulses for unblocking the oscillograph during short periods at the time during which the alternating voltage changes sign, and means for applying said pulses to said oscillograph to produce form deflection.

4. An apparatus in accordance with claim 3 wherein said means for producing a time deflection further comprises a phase shifter for adjusting the phase of the alternating voltage applied to the oscillograph so that said voltage changes sign during the period of said unblocking.

5. An apparatus for tracing on an oscillograph screen the forms of periodically repeated electrical phenomena comprising means for normally blocking the oscillograph to prevent it from indicating, means for generating and applying an alternating voltage to the oscillograph for producing time deflection, a delay network, a pulse generator controlled by the said alternating voltage to produce a train of rectangular pulses, means for applying said pulses to the input terminals of said network whereby each said rectangular pulse produces at said input terminals by reflection a pair of pulses of opposite sign, and means for applying the pulses of one sign to unblock the oscillograph.

6. An apparatus according to claim 5 in which the delay network is a non-dissipative artificial transmission line which is short circuited at a point beyond the input terminals.

7. An apparatus according to claim 1 in which the means for generating the first mentioned short periodically repeated electrical pulses comprises a delay network consisting of a nondissipative artificial transmission line which is short-circuited at a point intermediate the input and output terminals, whereby pairs of pulses of opposite sign are produced at said intermediate point, an amplifier connected at said intermediate point and so biassed as to suppress all the said pulses of one sign in the pairs of pulses, and means for applying the remaining ones of said pulses to deflection circuits of the oscillograph.

8. An apparatus for tracing on an oscillograph screen the forms of periodically repeated electrical phenomena comprising means for normally blocking the oscillograph to prevent it from indicating, means for generating and applying an alternating voltage to the oscillograph for producing a time deflection, means including a pulse generator controlled by the alternating voltage for unblocking the oscillograph for short periods during which the applied voltage changes sign, a phase shifter for adjusting the phase of the alternating voltage applied to the oscillograph for producing the time deflection so that the applied voltage changes sign during the periods of the unblocking, and a second phase shifter connecting the output of the first mentioned phase shifter to the pulse generator.

MAURICE MOISE LEVY.
THOMAS WILLIAM ELLIOTT.